M. J. GRIFFIN.
CALK.
APPLICATION FILED OCT. 28, 1919.
1,406,374.
Patented Feb. 14, 1922.
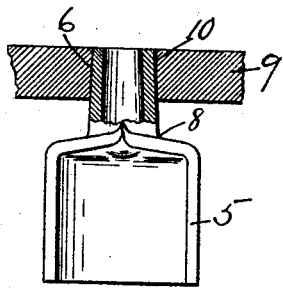
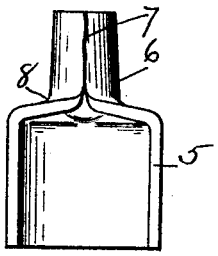
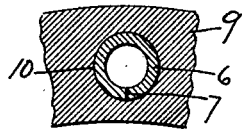
INVENTOR.
Michael J. Griffin.
BY
Arthur Jenkins,
ATTORNEY.

UNITED STATES PATENT OFFICE.

MICHAEL J. GRIFFIN, OF HARTFORD, CONNECTICUT.

CALK.

1,406,374.

Specification of Letters Patent.   Patented Feb. 14, 1922.

Application filed October 28, 1919. Serial No. 333,868.

*To all whom it may concern:*

Be it known that I, MICHAEL J. GRIFFIN, a citizen of the United States, residing in Hartford, in the county of Hartford and State of Connecticut, have invented a new and improved Calk, of which the following is a specification.

My invention relates to the class of devices above described; and an object of my invention, among others, is to provide a horseshoe calk with means for securely attaching it to a horseshoe.

One form of calk embodying my invention and in the construction and use of which the objects herein set out, as well as others, may be attained, is illustrated in the accompanying drawings, in which—

Figure 1 is a view through a portion of a horeshoe cut in section to illustrate my improved calk in place therein, the shank of the calk being partially cut in section;

Fig. 2 is a view in elevation of my improved calk; and

Fig. 3 is a view in section through a horseshoe and in cross-section through the shank of my improved calk shown in place therein.

My improved calk is of the class known as driven calks, that is, calks that are tightly driven to place in openings provided for them in horseshoes. It has, however, been found a very difficult matter to so secure these calks that they will not become loose and fall out in use, for the reason that the metal of the calk shanks resists displacement to a greater degree than does the metal comprising the comparatively thin shoes, consequently the metal of the shoe stretches, causing the holes for the shanks in the shoes to be gradually enlarged and the calks under the repeated blows in use to be driven further and further into said openings; and it has been noted that these openings, once enlarged, do not contract, as there is insufficient resiliency in the metal of the shoe to effect such result. Consequently this gradual enlargement of the openings takes place until the shoulders at the bases of the shanks strike the under side of the shoes, and shortly after this takes place further use enlarges the openings still a little more and causes the calks to become loose and fall out.

By the use of my improved calk I have avoided these objections, such a calk being shown herein that is preferably composed of sheet-metal stamped to shape and formed as by means of dies. An important feature of the invention is a calk thus produced embodying a spur 5 preferably of curved form in cross-section and a shank 6 of tubular form in cross-section and having meeting edges 7, a shoulder 8 being formed at the base of the shank and between it and the spur.

The meeting edges 7 of the shank are relatively disposed with a very slight space, or at least a loose contact when the calk is made, to provide for a consequent slight contraction of the shank as the calk is driven to place. By making the shank of tubular form it is weaker and will yield more readily than the metal composing the shoe 9, into the openings 10 of which the calks are driven. A result of this construction is that when the calk is driven to place in the shoe the meeting edges of the shank are pressed into close, firm contact. The structure of the shank is, however, owing to its tubular form, such as to cause it to yield before the metal of the shoe yields, consequently the size of the hole in the shoe is not increased, neither is the size of the shank permanently decreased, as the latter has sufficient resiliency to return to its original size. The meeting edges of the shank being pressed together in the manner above set out, provides for a restricted contraction of a shank as it is forced into a hole in the shoe, consequently the contraction, when the shank is driven to place, is exhausted to such extent that further contraction cannot take place, the shank will not become loose, and the calk is therefore securely held with little liability of becoming loose in use. The shank of the calk is preferably tapered so that it may be driven tightly to place and the slight contraction of the shank, owing to the disposition of the metal, will cause it to be constantly held tightly in place. Should my improved calk with tubular shank be made continuous, as to the walls of the shank, that is the shank not being split, this tubular disposition of the metal would still provide a shank having the qualities of restricted contraction hereinabove described that would permit the shank to contract to a certain extent rather than expand the metal of the shoe, with a result that the calk will be held tightly in place, and the effect of this action will be readily appreciated when it is stated that a difference of from one to two thousandths of an inch is sufficient to secure the desired results.

In accordance with the provisions of the patent statutes, I have described the principles of operation of my invention, together with the device which I now consider to represent the best embodiment thereof, but I desire to have it understood that the device shown is only illustrative, and that the invention may be carried out by other means.

I claim—

1. A shoe calk comprising a spur, a tubular shank with a single wall split lengthwise thereof to provide for restricted circumferential contraction when the calk is driven to place in a shoe, and a shoulder to determine the extent of movement of the shank into the shoe and consequently the extent of contraction of the shank.

2. A shoe calk comprising a spur, a tapered shank tubular in shape having a single split side, said split extending lengthwise thereof to provide for restricted circumferential contraction, and a shoulder to determine the extent of movement of the shank into the shoe and consequently the extent of contraction of the shank.

MICHAEL J. GRIFFIN.